(12) United States Patent
Abdel-Kader et al.

(10) Patent No.: US 7,773,517 B2
(45) Date of Patent: Aug. 10, 2010

(54) METHOD AND SYSTEM FOR IDENTIFYING DEGRADATION OF A MEDIA SERVICE

(75) Inventors: Sherif Abdel-Kader, Waterloo (CA); Michael Chen, Kitchener (CA)

(73) Assignee: Research In Motion Limited, Waterloo (CA)

(*) Notice: Subject to any disclaimer, the term of this patent is extended or adjusted under 35 U.S.C. 154(b) by 899 days.

(21) Appl. No.: 10/991,514

(22) Filed: Nov. 19, 2004

(65) Prior Publication Data

US 2006/0109786 A1 May 25, 2006

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ............... 370/232; 370/230; 370/233; 370/235; 370/352; 455/8; 455/9; 455/63.1; 455/67.13; 455/421; 455/501

(58) Field of Classification Search ........... 455/8, 455/9, 63.1, 67.13, 421, 501; 370/230, 232, 370/233, 235, 352

See application file for complete search history.

(56) References Cited

U.S. PATENT DOCUMENTS

| | | | |
|---|---|---|---|
| 5,995,830 A | 11/1999 | Amin et al. | |
| 6,633,760 B1 | 10/2003 | Ham et al. | |
| 6,745,031 B2 | 6/2004 | Chun et al. | |
| 6,771,594 B1 * | 8/2004 | Upadrasta | 370/228 |
| 6,886,040 B1 * | 4/2005 | Fitzgerald | 709/224 |
| 2003/0097438 A1 * | 5/2003 | Bearden et al. | 709/224 |

(Continued)

FOREIGN PATENT DOCUMENTS

EP 1168732 1/2002

(Continued)

OTHER PUBLICATIONS

European Search Report corresponding to European Patent Application No. EP 04105932.0.

(Continued)

*Primary Examiner*—Patrick N Edouard
*Assistant Examiner*—Shantell Heiber
(74) *Attorney, Agent, or Firm*—Ridout & Maybee LLP

(57) ABSTRACT

A method and device for identifying degradation in service quality for a wireless media service. The wireless media service has a known expected packet generation rate, which may be determined by the device based upon the codec and payload size selected on initiating the media service. At a receiving device, the packets actually received by the device from the other termination point are counted over a time period, and this number is compared with the number of packets that were expected based upon the known packet generation rate. From this comparison a packet loss rate may be determined. If the packet loss rate exceeds a threshold level, then the device may issue a user alert, terminate the service, or take other action. The threshold level may be established based upon a packet loss rate corresponding to a significant degree of service quality degradation.

22 Claims, 3 Drawing Sheets

U.S. PATENT DOCUMENTS

| | | | |
|---|---|---|---|
| 2003/0129978 | A1 | 7/2003 | Keiji et al. |
| 2004/0203424 | A1 | 10/2004 | Akhteruzzaman et al. |
| 2004/0203607 | A1 | 10/2004 | Satapathy |
| 2005/0044443 | A1* | 2/2005 | Magnaghi et al. ............... 714/4 |
| 2005/0052996 | A1* | 3/2005 | Houck et al. ................. 370/230 |
| 2006/0104366 | A1* | 5/2006 | Huang et al. ........... 375/240.27 |
| 2007/0008883 | A1* | 1/2007 | Kobayashi .................. 370/230 |

FOREIGN PATENT DOCUMENTS

| | | |
|---|---|---|
| EP | 1414179 | 4/2004 |
| WO | WO 02/078261 | 10/2002 |

OTHER PUBLICATIONS

Karol M. et al. "VoIP Network Failure Detection and user Notification", Computer Communications and Networks, 2003. ICCCN 2003. Proceedings. The 12th International Conference on Dallas, TX, USA Oct. 20-22, 2003.

Cisco, "Voice Over IP—Per Call Bandwidth Consumption", Jun. 17, 2004; http://kbase:8000/paws/servlet,ViewFile/7934/bwidth_consume.xml.

* cited by examiner

METHOD AND SYSTEM FOR IDENTIFYING DEGRADATION OF A MEDIA SERVICE

FIELD OF TECHNOLOGY

The present application relates to methods and devices for predicting quality-of-service problems with media services and, in particular, to a method and device that identifies degraded media service on the basis of packet loss rate.

BACKGROUND INFORMATION

Many wireless mobile devices are capable of engaging in media services over a wireless network wherein they send and receive media packets. One common such service is a Voice-over-IP (VoIP) call. Network congestion and RF transmission problems can lead to lost packets. Many of the protocols used for media services, like real-time transport protocol (RTP), are focused on packet throughput and efficiency so as to deliver real-time or near-real-time services. Accordingly, lost packets may not be resent or recovered. When packet loss becomes significant, the service quality may become noticeably degraded and the user may have difficulty understanding audio or video. In a VoIP call, packet loss can introduce jitter, clicks, stutter, and other audio artefacts that detract from the user's speech comprehension. Once packet loss becomes significantly high, the media, e.g. audio or video, may become incomprehensible to a user.

It would be advantageous for a mobile device to be able to assess the level of service degradation due to packet loss. Some protocols provide for dissemination of packet statistics. For example, the RTP standard has an associated real-time transport control protocol (RTCP) which provides for the exchange of periodic RTCP packets that contain statistics on the number of packets sent and received. A drawback to this model of gathering packet statistics is that it depends on the sending and receipt of RTCP packets between termination points. If the media path is significantly degraded such that RTP packets are being lost, then there is a reasonable likelihood that an RTCP packet may also be lost.

BRIEF SUMMARY

The present application describes a method and device for identifying the degradation in service quality for a media service. The receiving device knows an expected packet generation rate for the other termination point, which may be determined by the receiving device based upon the codec and payload size selected on initiating the media service. The packets actually received by the device from the other termination point are counted over a time period, and this number is compared with the number of packets that were expected based upon the packet generation rate. From this comparison a packet loss rate may be determined. If the packet loss rate exceeds a threshold level, then the device may issue a user alert, terminate the service, or take other action.

In one aspect, the present application provides a method of identifying degradation of a media service. The media service is conducted by a wireless device in a wireless system and the media service has an expected packet generation rate. The method includes steps of counting a number of data packets actually received by the wireless device over a period of time, calculating a packet loss rate from the counted number of data packets and the expected packet generation rate, and determining that the media service is experiencing significant quality degradation based upon the packet loss rate exceeding a threshold.

In another aspect, the present application provides a mobile wireless device for engaging in a media service through a wireless communication system. The media service has an expected packet generation rate. The mobile wireless device includes a communications subsystem for establishing a connection with the wireless communication system and receiving RF communications, including data packets from a termination point, a memory storing the expected packet generation rate, and a processor associated with the memory and controlling the communications subsystem. The mobile device also includes a packet loss module for identifying degradation of the media service. The packet loss module includes a packet loss calculation component for counting a number of data packets actually received over a period of time and calculating a packet loss rate from the counted number of data packets and the expected packet generation rate, and a service degradation handling component for determining that the media service is experiencing significant quality degradation based upon the packet loss rate exceeding a threshold.

Other aspects and features of the present application will be apparent to one of ordinary skill in the art in light of the following detailed description and drawings depicting one or more embodiments.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION

Figure 1:
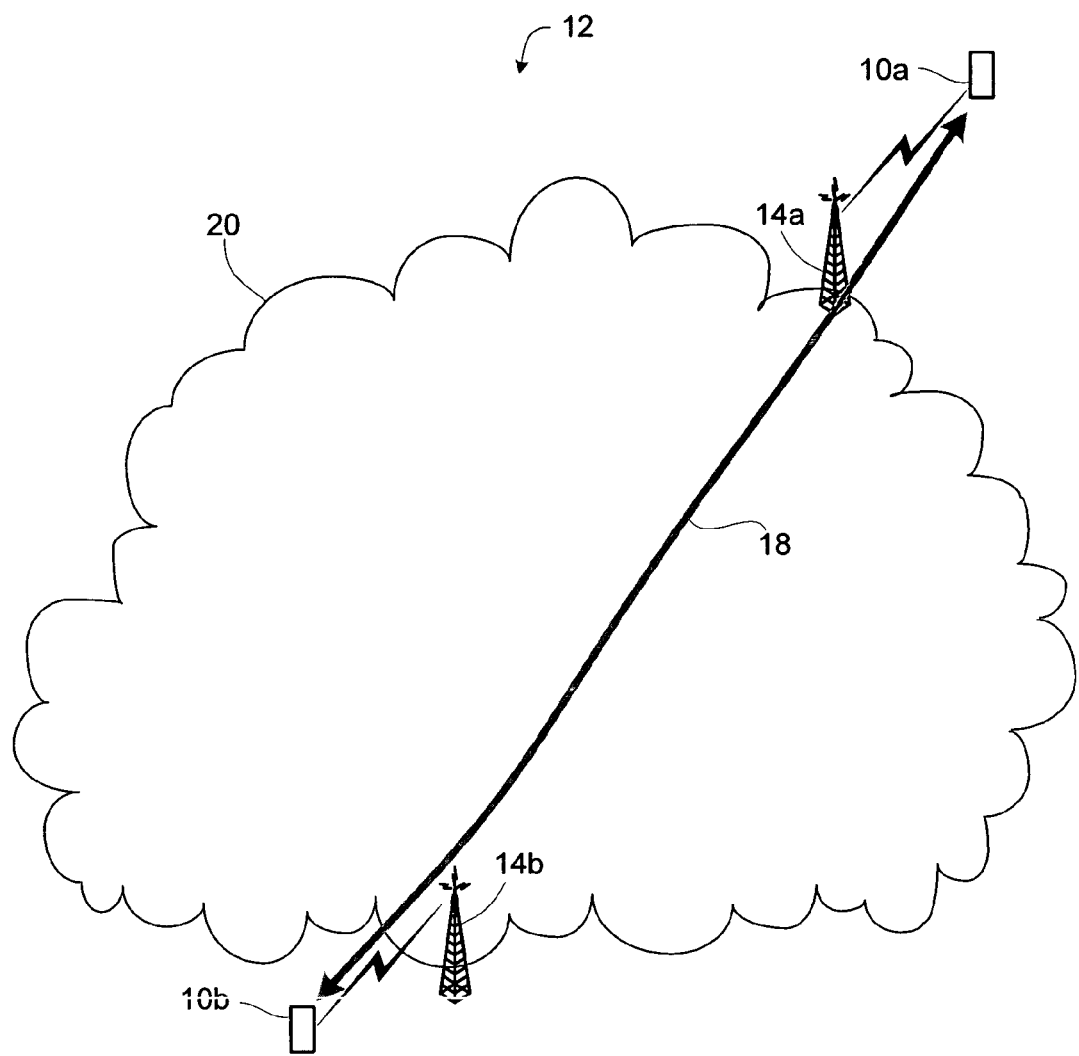
FIG. 1 diagrammatically shows a wireless communications system.

Reference is first made to FIG. 1, which diagrammatically shows a wireless communications system 12. The wireless communications system 12 includes a plurality of access points or base stations 14 (two are shown individually as 14a and 14b) interconnected in a network 20. The wireless communications system 12 may comprise a wireless local area network associated with a campus, building, or other facility. For example, the wireless communication system 12 may comprise a wireless network conforming to IEEE 802.11 standards. In other embodiments, the wireless communications system 12 may comprise any wireless communications network or combination of interconnected networks, including, without limitation, TDMA, CDMA, GSM/GPRS, EDGE, UMTS or CDPD. The wireless communications system 12 may be connected to other networks or communication system including, for example, the public switched telephone network (PSTN) (not shown), or a wide area network such as the Internet (not shown).

As is known, the base stations 14 perform radio frequency (RF) protocols to support data and voice exchanges with one or more mobile devices 10 (shown individually as 10a and 10b). Each mobile device 10 is configured to exchange RF-based communications with one of the base stations 14 using known protocols. The mobile device 10a may establish a service with another mobile device 10b or other termination point, wherein the service includes sending and/or receiving media packets through the wireless communications system 12 over a media path 18. The media packets relate to real-time media, such as audio, video, or multi-media applications. In one embodiment, the media packets relate to a Voice-over-IP call. In other embodiments the media packets may relate to video sessions, streaming audio or video, real-time gaming applications or other multi-media sessions. Such a media session may be established over IP-based networks using real-time transport protocol (RTP) on top of user datagram protocol (UDP). Session initiation protocol (SIP) or other control protocols may be employed to set-up, manage, control, and or tear down media paths between termination points.

Although FIG. 1 depicts a media session between two mobile devices 10 in the wireless communication system 12, it will be appreciated that the present application is not limited to point-to-point media sessions and may include multi-cast or broadcast communications. Moreover, the present application is not limited to communications within the wireless communications system 12. The media session may be established between a mobile device 10 within the wireless communication system and termination points located on other networks connected with the wireless communication system 12, including through the Internet or the PSTN. The termination points are not necessarily other mobile devices 10, and may include IP phones, personal computers, gateways, media servers, and any other device capable of terminating a media service.

A VoIP session or other media session, including a video session, may employ any one of a number of codecs for encoding, and possibility compressing, the media data for packetization and transport. A common audio codec that employs pulse-code modulation (PCM) is the G.711 protocol established by the International Telecommunications Union (ITU). Other ITU standards include G.729, G.726, and G.723.

The selected codec establishes a known sample rate. For example, the G.711 protocol employs a sample rate of 8000 Hz. Typically, multiple samples are packaged by a sending device into a packet for transmission over the network to a receiving device. Those of ordinary skill in the art will recognize that use of a given codec having an established sampling rate does not necessarily lead to a particular packet rate in all implementations under the RTP standard as defined in RFC 3550 issued by the Internet Engineering Task Force (IETF). However, IETF RFC 1890 regarding audio and video conferencing suggests a default packet interval of 20 ms for packetized audio. In some embodiments, the packet interval might also be 10 ms, 30 ms, 40 ms, or 50 ms.

The packet interval depends on the codec sampling rate, the sample resolution or byte size, and the packet payload size. For example, under G.711, which uses a sample rate of 8000 Hz (a bit rate of 64 kbps) one might select a payload size of 160 bytes, which leads to a packet interval of 20 ms, i.e. a packet per second rate of 50. One might alternatively select a payload size of 240 bytes, which would lead to a packet interval of 30 ms, i.e. a packet per second rate of 33.33. As another example, a codec using G.729 has a sample rate of 1000 Hz (a bit rate of 8 kpbs) and one might select a payload size of 20 bytes, which would lead to a packet interval of 20 ms, i.e. a packet per second rate of 50.

In the present application, the mobile devices 10 operate using a predetermined packet interval or packet generation rate for communications over the media path 18. The packet interval or generation rate is determined based upon the codec sampling rate and the packet payload size. In many embodiments, these factors are established during the call setup. For example, the device initiating the call may specify the codec to be used in the call. The initiating device may offer a selection of possible codecs and the responding device may select one of the codecs that it supports. The devices may also agree on a payload size. In one embodiment, these factors are negotiated or agreed upon using SIP. Once these factors are settled, i.e. once the devices determine the codec and the payload size, they can calculate or determine the packet generation rate. This rate may then be stored on the devices for use in determining the packet loss rate, as described below.

In accordance with the present application, the mobile device 10 determines a packet loss rate with respect to packets sent by a termination point by counting the number of received packets over a time period and comparing the number of received packets with the expected number of received packets, wherein the expected number of received packets is established by the predetermined packet generation rate. Based upon the packet loss rate, the mobile device 10 is able to assess the quality of service. Packets may be lost due to a number of factors, including attenuation of or interference with RF signals between the base station 14 and the mobile device 10, or network congestion within the network 20. Once the packet loss rate reaches certain thresholds, the quality of service becomes noticeably degraded. If the service quality becomes sufficiently degraded, then the media may become largely unintelligible. For example, packet loss in a VoIP call can result in clicks, stutter, audio jitter, and other artefacts. With significant degradation, a recipient may be unable to hear the other party clearly or at all.

The present application allows the mobile device 10 to automatically detect when packet loss becomes high enough to cause significant degradation of the quality of service. If the packet loss rate reaches a predetermined threshold, then the mobile device 10 may take action. In some embodiments, the mobile device 10 may alert the user with a sensible output, such as a sound, flashing display or LED, or vibration. The alert signal notifies the user that the mobile device 10 has detected a degraded media session and there is a risk of further degradation to the quality of service. In another embodiment, where the threshold indicates a largely unintelligible service, the mobile device 10 may initiate an automatic service termination to avoid having the service continue to consume network resources when it is no longer functional from a quality of service point of view.

Figure 2:
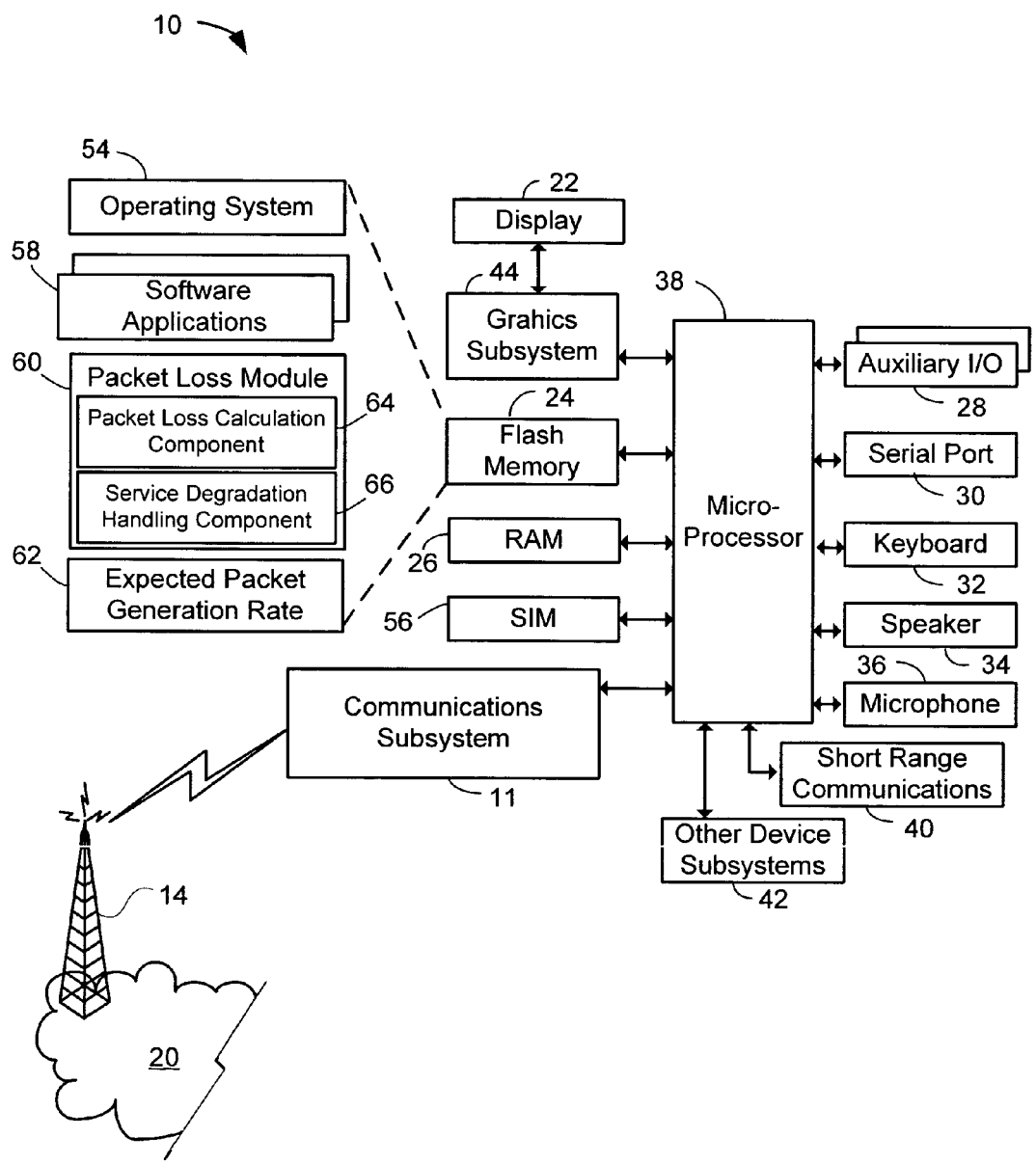
FIG. 2 shows a block diagram of an embodiment of a mobile device.

Reference is now made to FIG. 2, which shows a block diagram of an embodiment of a mobile device 10. The mobile device 10 is a hand-held two-way mobile communication device having at least data and possibly also voice communication capabilities. In an example embodiment, the device has the capability to communicate with other computer systems on the Internet. In various embodiments, the mobile device 10 may include a data communication device, a multiple-mode communication device configured for both data and voice communication, a mobile IP telephone, a mobile communication device, a PDA enabled for wireless communications, a 1-way or 2-way pager, a wireless modem operating in conjunction with a computer system, and any other type of mobile wireless communication device capable of engaging in real-time packet-based communication services such as, for example, VoIP. In the presently described embodiment, the mobile device 10 is configured to operate within the wireless communications system 12. It should be appreciated however that the present application is in no way limited to these example types of devices and may be implemented in other devices.

The device 10 includes a communication subsystem 11. The communications subsystem 11 manages the wireless RF communications with base stations 14 in the wireless communications system 12. The communication subsystem 11 may include one or more antennae, a transceiver, a processing element like a digital signal processor and other components. As will be apparent to those skilled in the field of communications, the particular design of the communication subsystem 11 will be dependent upon the wireless communications system 12 in which the device 10 is intended to operate. The communication subsystem 11 manages the tasks of establishing a connection with a base station 14 and sending and receiving packets over the connection.

The device 10 includes a microprocessor 38 that controls the overall operation of the device 10. The microprocessor 38 interacts with the communications subsystem 11 and also interacts with further device subsystems such as the display 22, flash memory 24, random access memory (RAM) 26, subscriber identity module (SIM) 56, auxiliary input/output (I/O) subsystems 28 (which may include a thumb-wheel, for example), serial port 30, keyboard or keypad 32, speaker 34, microphone 36, a short-range communications subsystem 40, and any other device subsystems generally designated as 42.

Some of the subsystems shown in FIG. 2 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Host operating system software 54 and various host software applications 58 used by the microprocessor 38 are, in one example embodiment, stored in a persistent store such as flash memory 24 or similar storage element. Host software applications 58 may include a wide range of applications, including a text messaging application, a ring tone application, a contacts application, and/or a game application. Those skilled in the art will appreciate that the host operating system 54, specific host applications 58, or parts thereof, may be temporarily loaded into a volatile store such as RAM 26. It is contemplated that received communication signals may also be stored to RAM 26.

The microprocessor 38, in addition to its operating system functions, enables execution of host software applications 58 on the device. A predetermined set of host applications 58 which control basic device operations, including at least voice communication applications for example, will normally be installed on the device 10 during manufacture. Further applications may also be loaded onto the device 10 through the WLAN 12, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a communication mode, a received signal such as a voice call, a text message, or web page download will be processed by the communication subsystem 11 and input to the microprocessor 38, which will preferably further process the received signal for output to the speaker 34 or the display 22, or alternatively to an auxiliary I/O device 28. A user of device 10 may also compose data items such as text messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads, including user interface information, to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

The mobile device 10 includes a packet loss module 60 for determining a packet loss rate and for determining whether the packet loss rate indicates a degraded service quality. The mobile device 10 may also include an expected packet generation rate 62. As described above, the expected packet generation rate 62 may be calculated or determined by the device 10 once it agrees upon a codec and payload size to be used in a particular media service. In one embodiment, the mobile device 10 includes a look-up table that stores the expected packet generation rates 62 corresponding to various combinations of codecs and payload sizes. Once a codec and payload size is determined for a given media service session, the device 10 is able to determine the expected packet generation rate 62 from the look-up table.

The packet loss module 60 may include a packet loss calculation component 64 and a service degradation handling component 66. The packet loss calculation component 64 calculates the packet loss by counting the number of received packets over the course of a predetermined time period. At expiry of the predetermined time period, the packet loss calculation component 64 determines the packet loss rate in accordance with the following formula:

$$\frac{\text{Number of RTP packets expected} - \text{Number of RTP packets received}}{\text{Number of RTP packets expected}}$$

The number of RTP packets expected is determined by multiplying the length of the predetermined time period with the expected packet generation rate 62. The predetermined time period is selected so as to be long enough to reduce the impact of any anomalous delays in packet transmission. In one embodiment, the predetermined time period is about 10 seconds and the expected packet generation rate 62 is 50 per second (1 every 20 ms), which leads to an expected number of RTP packet of 500. If the number of packets received is, for example, 450, then the packet loss rate is (500−450)/500, which is 0.1 or 10%.

The service degradation handling component 66 receives the calculated packet loss rate from the packet loss calculation component 64. The service degradation handling component 66 compares the calculated packet loss rate with one or more threshold values and may take action if the packet loss rate exceeds one or more of the threshold values.

In one embodiment, the service degradation handling component 66 applies a first threshold. If the packet loss rate exceeds the first threshold, then the service degradation handling component 66 outputs an alert signal. The alert signal triggers a sensible output from the mobile device 10. The sensible output may comprise a beep or other audible signal. The audible signal may be injected into the voice data of a VoIP call or may be output separately from the audio of the VoIP call. The output may also or alternatively be a visual or kinetic signal. For example, the alert may by output by way of display screen or LED. The alert might also be signalled using vibration or other kinetic signals. The alert signal may be output once or may be output repeatedly. If output repeatedly, then the user may be permitted to turn off the alert through a keystroke, key combination, soft key or other input mechanism.

The first threshold is established by determining a packet loss rate that coincides with a significant degree of service quality degradation. The threshold may differ for different applications. In one embodiment, for a VoIP call, the first threshold is set between about 10% and 20%.

When a user receives a sensible output that signifies a degraded service quality, the user may elect to continue with the call or intentionally terminate the call. The user may also elect to terminate another application or service that is consuming bandwidth and contributing to congestion or packet loss. The alert signal may also serve to notify the user that the service quality could degrade further, which could trigger other action by the mobile device 10, as described below.

In another embodiment, the service degradation handling component 66 applies a second threshold. The second threshold may be applied in addition to the first threshold or instead of the first threshold. If the service degradation handling component 66 determines that the calculated packet loss rate exceeds the second threshold, then the service degradation handling component 66 triggers termination of the active service. For example, if the service is a VoIP call, then the service degradation handling component 66 triggers issuance of a call release command or message. In an embodiment employing SIP to manage call control, the mobile device 10 sends a SIP BYE message.

The second threshold is established by determining a packet loss rate that coincides with a degree of service quality degradation that renders the service nearly unintelligible. For example, with a VoIP call, the second threshold may be established by determining a packet loss rate at which the speech of the other user becomes very difficult or impossible to hear due to the lost packets. In one embodiment, for a VoIP call, the second threshold is about 30%.

Although FIG. 2 depicts the packet loss module 62 as residing in flash memory 24 for execution by the microprocessor 38, those of ordinary skill in the art will appreciate that the packet loss module 62 may be incorporated as a part of the communication subsystem 11 and may be executed by a processor internal to the communication subsystem 11.

Figure 3:
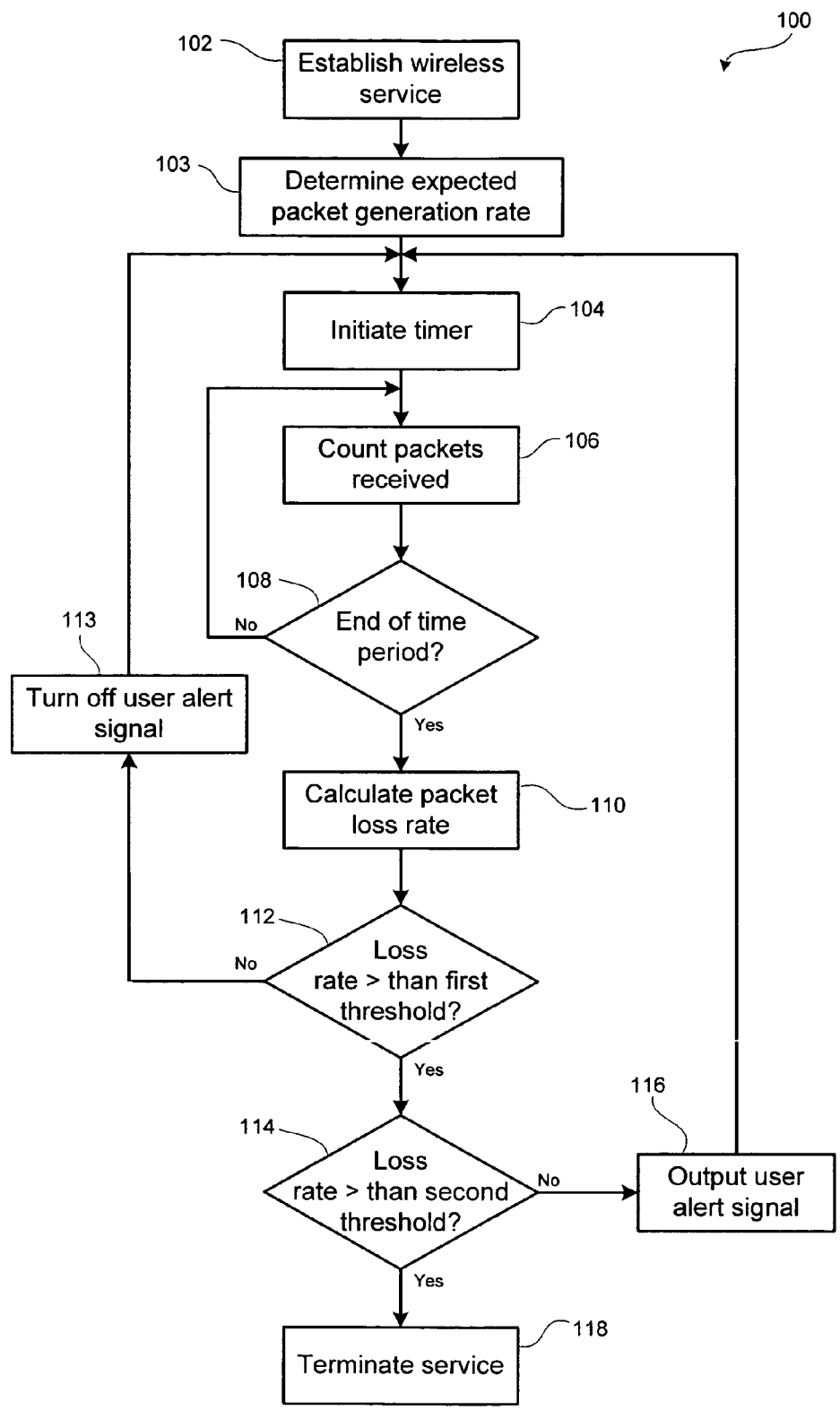
FIG. 3 shows, in flowchart form, a method for identifying degrading quality of a wireless service using a mobile device.

Reference is now made to FIG. 3, which shows, in flowchart form, a method 100 of identifying degrading quality of a wireless service using a mobile device. The method 100 begins in step 102, wherein a wireless service, like a VoIP call, is established between the mobile device and one or more termination points.

As discussed above, the mobile device stores a predetermined packet generation rate associated with the service, wherein the predetermined packet generation rate is the rate at which the termination point generates packets for transmission to the mobile device. It will be appreciated that in multi-party media session, such as a conference call, the mobile device may store a predetermined packet generation rate for each party and may perform the method 100 in connection with packets received from each party. As explained above, the predetermined packet generation rate may be calculated or determined by the device during the service set-up or initiation after a particular codec and payload size are selected for the service. Therefore, FIG. 3 shows a step 103 wherein the device determines or calculates the predetermined packet generation rate. As noted above, the device may employ a look-up table or similar mechanism to determine this rate.

In step 104, the mobile device starts a timer. While the timer runs, in step 106 the mobile device counts the number of packets received from the termination point. The mobile device continues to count received packets until the time reaches the end of a predetermined time period in step 108.

Once the end of the time period is reached, then in step 110 the mobile device calculates the packet loss rate. As described above, the packet loss rate is determined from the number of packets actually received, the expected packet generation rate, and the length of the time period. The mobile device then compares the packet loss rate with a first threshold in step 112. If the packet loss rate does not exceed the first threshold, then the method 100 returns to step 104 to restart the timer and continue to monitor the packet loss rate.

If the packet loss rate does exceed the first threshold, then in step 114 the mobile device determines whether the packet loss rate exceeds a second threshold. The second threshold is higher than the first threshold, i.e. it indicates a higher packet loss rate. If the calculated packet loss rate lies between the first and second thresholds, then the method 100 continues to step 116, wherein the mobile device triggers a user alert signal. As described above, this signal may be auditory, visual, and/or kinetic. Following triggering of the user alert signal, the method 100 returns to step 104 to restart the timer and reassess the packet loss rate. If, on reassessing the packet loss rate (step 112) it is found to be below the first threshold, then the method 100 returns to step 104 through step 113. In step 113, the user alert signal may be turned off. In some embodiments, the user alert signal may be a discreet occurrence (e.g. an audio beep) that does not need to be "turned off" in step 113; however, in other embodiments, the user alert signal may be an ongoing occurrence that must be turned off once the packet loss rate is found to have recovered.

If the packet loss rate exceeds the second threshold, then in step 118 the mobile device terminates the active service. For example, the mobile device may issue a call release command or message, such as a SIP BYE message.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of identifying degradation of a media service, the media service being conducted by a wireless device in a wireless system, the media service having an expected packet generation rate, the method comprising the steps of:

establishing the media service, including pre-determining, at said wireless device, the expected packet generation rate based upon a codec and a payload size selected for the media service;

counting a number of data packets actually received by said wireless device over a period of time;

calculating, at said wireless device, an expected number of packets from the product of said period of time and the expected packet generation rate;

estimating, at said wireless device, the number of lost packets by comparing said counted number of data packets with the expected number of packets and calculating a packet loss rate therefrom; and determining, at said wireless device, that the media service is experiencing significant quality degradation based upon said packet loss rate exceeding a threshold.

2. The method claimed in claim 1, wherein said step of determining includes triggering output of a user alert signal if said packet loss rate exceeds said threshold.

3. The method claimed in claim 2, wherein said user alert signal comprises a sensible signal selected from the list consisting of an auditory signal, a visual signal, and a kinetic signal.

4. The method claimed in claim 2, wherein said threshold comprises a packet loss rate between 10% and 20%.

5. The method claimed in claim 1, wherein said step of determining includes terminating the media service if said packet loss rate exceed said threshold.

6. The method claimed in claim 5, wherein said step of terminating said service comprises sending a service termination message.

7. The method claimed in claim 5, wherein said threshold comprises a packet loss rate of about 30%.

8. The method claimed in claim 1, wherein said threshold includes a first threshold and a second threshold and wherein said step of determining includes triggering output of a user alert signal if said packet loss rate is between said first threshold and said second threshold, and terminating the service if said packet loss rate exceeds said second threshold.

9. The method claimed in claim 1, wherein the media service is established over real-time transport protocol and wherein the media service employs a codec conforming to the G.711 standard for encoding audio media.

10. The method claimed in claim 1, wherein said step of comparing comprises a step of calculating said packet loss rate in accordance with the formula:

$$\frac{\text{Number of expected packets} - \text{Number of data packets received}}{\text{Number of expected packets}}.$$

11. The method claimed in claim 1, wherein said step of pre-determining includes reading a look-up table containing expected packet generation rates corresponding to various codecs and payload sizes.

12. A mobile wireless device for engaging in a media service through a wireless communication system, the media service having an expected packet generation rate, the mobile wireless device comprising:

a communications subsystem for establishing a connection with the wireless communication system and receiving RF communications, including data packets from a termination point;

a memory storing the expected packet generation rate;

a processor associated with said memory and controlling said communications subsystem; and a packet loss module for identifying degradation of the media service, said packet loss module including, a packet loss calculation component for counting a number of data packets actually received over a period of time and calculating a packet loss rate from an estimated number of lost packets obtained by comparing said counted number of data packets with an expected number of packets, a service degradation handling component for determining that the media service is experiencing significant quality degradation based upon said packet loss rate exceeding a threshold, and a component for pre-determining the expected packet generation rate based upon a codec and a payload size selected for the media service and for calculating the expected number of packets from the product of said period of time and the expected packet generation rate.

13. The device claimed in claim 12, wherein said service degradation handling component includes a component for triggering output of a user alert signal if said packet loss rate exceeds said threshold.

14. The device claimed in claim 13, wherein said user alert signal comprises a sensible signal selected from the list consisting of an auditory signal, a visual signal, and a kinetic signal.

15. The device claimed in claim 13, wherein said threshold comprises a packet loss rate between 10% and 20%.

16. The device claimed in claim 12, wherein said service degradation handling component includes a component for terminating the media service if said packet loss rate exceed said threshold.

17. The device claimed in claim 16, wherein component for terminating sends a service termination message.

18. The device claimed in claim 16, wherein said threshold comprises a packet loss rate of about 30%.

19. The device claimed in claim 12, wherein said threshold includes a first threshold and a second threshold and wherein said service degradation handling component includes a component for triggering output of a user alert signal if said packet loss rate is between said first threshold and said second threshold, and includes a component for terminating the media service if said packet loss rate exceeds said second threshold.

20. The device claimed in claim 12, wherein the media service is established over real-time transport protocol and wherein the media service employs a codec conforming to the G.711 standard for encoding audio media.

21. The device claimed in claim 12, wherein said packet loss calculation component includes a component for calculating said packet loss rate in accordance with the formula:

$$\frac{\text{Number of expected packets} - \text{Number of data packets received}}{\text{Number of expected packets}}.$$

22. The device claimed in claim 12, wherein said memory further includes a stored look-up table containing expected packet generation rates corresponding to various codecs and payload sizes and wherein said component for pre-determining reads said look-up table.

* * * * *